Aug. 19, 1952    C. H. MacFARLAND    2,607,863
EXTENSIBLE CORD FOR ELECTRICAL APPLIANCE
Filed April 26, 1947
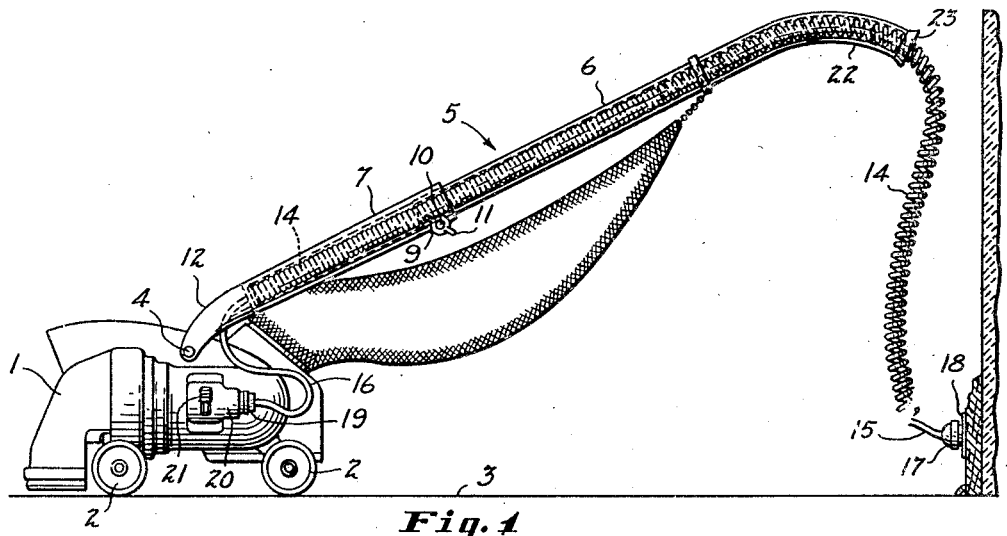
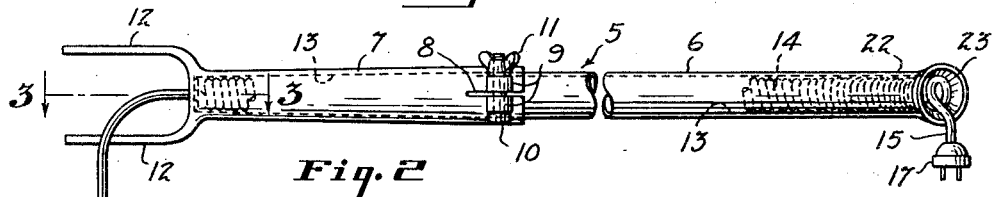
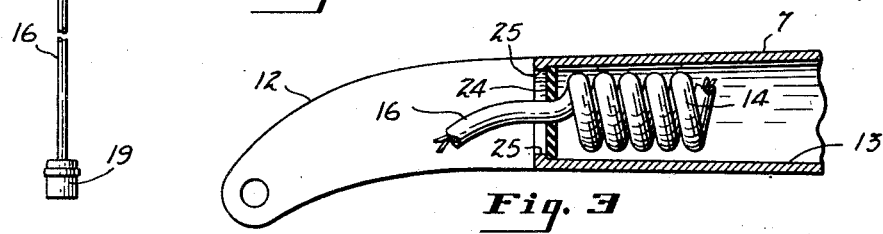
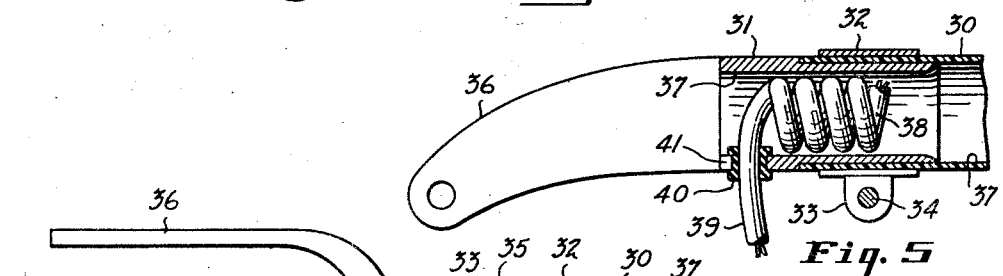
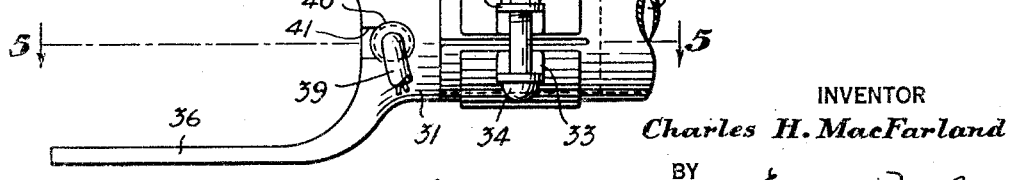
INVENTOR
Charles H. MacFarland
BY
Evans + McCoy
ATTORNEYS Patented Aug. 19, 1952

2,607,863

UNITED STATES PATENT OFFICE 2,607,863

EXTENSIBLE CORD FOR ELECTRICAL APPLIANCE

Charles H. MacFarland, Cleveland, Ohio, assignor to The Scott & Fetzer Company, Cleveland, Ohio, a corporation of Ohio Application April 26, 1947, Serial No. 744,178

3 Claims. (Cl. 191—12)

This invention relates to an electrical appliance such as a vacuum cleaner or the like having a body adapted to be moved over a surface, and, in particular, to a device for protecting and storing the electric cord by which current is supplied to the appliance.

It is an object of the present invention to provide an electrical appliance utilizing a highly resilient extensible cord to supply current to the appliance, which cord may be stored in a hollow member, such as the handle, so that upon applying tension to the cord due to movement of the appliance with respect to the current source the cord will elongate out of the handle member as it is needed and when such tension is released the cord will automatically contract into the handle member.

Another object is to provide an electrical appliance and conductor cord therefor in which the cord is resiliently extensible and is stored in a tubular member, such as the handle, where it will not interfere with the use of the appliance when the appliance is operated.

A still further object is to provide an electrical appliance in which the conductor cord is ressiliently extensible and stored in a hollow member which is designed so that the cord is normally out of the operator's way but which may be readily removed for repair or replacement.

Other objects and advantages may become apparent in the following detailed description accompanied by the drawings in which:

Figure 1 is an elevational view of an electrical appliance and a conductor cord embodying the present invention, shown connected to a current source;

Fig. 2 is an enlarged sectional view of the hollow handle member shown on the appliance in Fig. 1 and containing therein the resiliently extensible conductor cord;

Fig. 3 is an enlarged fragmentary view taken substantially on line 3—3 of Fig. 2;

Fig. 4 is an enlarged fragmentary view of a modified form of hollow member; and

Fig. 5 is an enlarged sectional view of the modification shown in Fig. 4 taken substantially on line 5—5 of Fig. 4.

For purposes of illustration the present invention is shown and described in connection with a vacuum cleaner, but it is to be understood that the principle of the invention may be equally well applied to any of a large number of other electrical appliances.

As shown in Fig. 1 the vacuum cleaner has a body 1 mounted on wheels 2 so that it may be readily moved along a surface 3, such as a carpet, floor or the like, in order to clean the same. Pivotally connected to the body 1 at the location indicated by the numeral 4 is a hollow tubular handle member, indicated generally by the numeral 5 and made of any suitable material, preferably non-conductive and inelastic.

In the form of the invention shown in Figs. 1 through 3, the handle comprises an upper section 6 and a lower section 7 joined in any suitable manner. For example, an end of the lower section 7 may be slightly enlarged to receive an end of the upper section 6 in a telescoping joint and the two sections may be clamped together. The end of the lower section 7 may be split as indicated by the numeral 8 in Fig. 2. Spaced ears 9 may be formed on the lower section 7 of the handle at points on opposite sides of the split 8, and the upper section 6 clamped to the lower section by a bolt 10 and a wing nut 11, the bolt passing through the ears 9 and the wing nut 11 threadedly engaged on the bolt. A two piece handle is very advantageous since it provides relatively short sections which may be disassembled for moving or storage purposes. The opposite end of the lower section 7 is bifurcated to provide two spaced arms 12 for pivotal attachment to the body 1 of the electrical appliance.

Sections 6 and 7 of the handle member 5 are provided with an internal passage or bore 13, adapted to receive a resiliently extensible conductor cord 14. As shown in the drawing, this resiliently extensible cord is arranged in the form of a helix, having a plurality of closely spaced coils. The cord 14 may be made of flexible wire conductor elements sheathed in an elastic composition, such as, natural or synthetic rubber, plastic, etc., which has been formed and thermally set so that the individual coils are closely spaced adjacent each other when in their free or unstressed state. Such a construction provides a highly resilient cord that will freely elongate when tension is applied thereto and will freely contract to its compacted position when the tension is released. Extremely satisfactory results have been obtained from the use in the present invention of cords of the type shown in the Campbell Patents 2,039,475 and 2,173,096. In one form of this cord, the helix is formed and the material thermally set in this configuration. Then the pitch of the individual coils may be reversed and a very tight helix results. The space between the exterior of individual coils when the cord is in its normal position is less than the thickness of the cord itself and the finished cord is highly resilient, returning to its compacted position when tension on the cord is released.

Preferably the passage 13 is of substantially uniform diameter throughout the handle 5, and the helical cord 14 may occupy the largest portion of this passage, having free ends 15 and 16 extending from the ends of the passage 13. Free end 15, of the cord 14, terminates in the conventional plug connector 17 for electrical attachment to a base plug or other suitable current source, indicated by the numeral 18. Free end 16 of the conductor cord 14 terminates in a connector member 19 adapted to be attached to the electrical appliance, preferably through a switch such as indicated by the numeral 20 in Fig. 1. Preferably the connector member 19 is smaller than the diameter of the passage 13 in order that it may freely pass therethrough when it is desired to remove the cord 14 for any purpose such as replacement. At the same time it is desirable that the connector member 17 be of a size larger than the diameter of the passage 13 to prevent it entering the passage 13. In this way the free end 15 of the cord 14 will always be available for the operator to connect to the source of current. The switch 20 may be located in any convenient location on the body 2 and is preferably provided with an exposed actuator 21 which may be operated manually or by pressure applied by the foot of the operator to turn the vacuum cleaner on or off as desired.

The handle member 5 may be straight or curved. As shown in the drawings, upper section 6 thereof is curved near its end to provide a hand grip portion 22. Preferably, the passage 13, through the handle member 5, terminates at the end leading to the current source in a flared opening 23 to facilitate passage of the helical portion of the cord 14 into and out of the passage 13 as the cord is expanded or contracted due to the movement of the electrical appliance with respect to the current source. If desired the opposite end of the passage 13 may be closed to prevent the passage of the helical portion of the cord 14 therethrough. A convenient form of closure may best be seen in Fig. 3 in which a plastic or fiber washer 24 encircles the free end 16 of the cord at the junction of the free end and the helical portion of the cord 14. The washer 24 is retained within the passage 13 by an annular flange 25 extending inwardly from the inner wall of the lower section 7 of the handle 5 at the end of the passage 13.

A modified form of the invention is shown in Figs. 4 and 5. In this form, the handle member comprises an upper section 30 and a lower section 31, the lower section 31 telescoping into the end portion of the upper section 30, and the two sections may be held together by a split clamping collar 32 having upstanding ears 33 which are held together clamping the sections in assembled position by a bolt 34 and nut 35. The lower section 31 of the handle member is provided with bifurcated arms 36 adapted for pivotal attachment of the handle and the electrical appliance. Sections 30 and 31 of the handle member are provided with a passage 37, of substantially uniform diameter, within which is disposed the resiliently extensible helically arranged portion of the conductor cord 38.

In the form of handle member shown in Figs. 4 and 5, an end of the helical portion of the conductor cord may be anchored with respect to the handle member. This may be done by passing the free end 39 of the cord 38 through a suitable washer or grommet 40, which grommet is retained in a slot 41 in the wall of the lower section 31 opening into the end of the passage 37. For example, the grommet 40 may be formed of an elastic material and be provided with a circumferential groove so that it will fit tightly in the slot 41.

In using a device embodying the present invention it is only necessary to connect the plug 17 to a suitable source of power, move the actuator 21 of the switch 20 to connect the vacuum cleaner and commence operation of the vacuum cleaner by gripping the hand grip 22 and moving the body 2 across the surface 3. It will be seen that the matter of cord supply during movement of the appliance with respect to the current source will be automatic. As the vacuum cleaner is moved away from the current source the cord 14 will expand or elongate and pass out of the flared opening 23 and, correspondingly, when the vacuum cleaner is moved toward the source of power the cord 14 will contract and portions thereof will automatically withdraw into the passage 13 through the flared opening 23.

When the operator is through utilizing the vacuum cleaner, it is only necessary to actuate the switch to disconnect the power, remove the plug from the source of power, and portions of the cord will contract into the passage where the cord may be stored until the next use. Obviously, if the axis of the handle member is disposed at an angle with the position of the cord leading to the current source or the resilience of the cord is not sufficient to cause automatic contraction, it may be necessary for the operator to assist in returning portions of the cord into the passage. The operator is not required to wrap the cord upon the handle or otherwise dispose of the cord for storage. Further, during operation of the device the danger of free cord getting in the way of the cleaner or the operator is not present. This makes for safer operating conditions, as there is no danger of running over the cord and causing a short circuit by damaging the insulation on the cord. By the use of a non-conductive, inelastic handle member the cord 14 is protected against damage during use or storage.

However, if the cord, after a period of time, should become worn so that it may be necessary to repair or replace the same, it is readily removable from the appliance. It is only necessary to disconnect the connector member 19 from the body 1 and pull on the free end 15 of the cord, and the entire cord will pass through the passage 13. Reinsertion of a new or repaired cord may be readily accomplished by placing the connector member 19 and the free end 16 into the flared opening 23 and feeding the cord through the passage until the connector member 19 appears at the opposite end of the passage.

The foregoing detailed description illustrated by the drawing is not to be construed as limiting the scope of the present invention as defined in the appended claims.

What I claim is:

1. In a vacuum cleaner, a cleaner body, a propelling handle comprising an elongated tube and a fork connecting the inner end of said tube to said cleaner body, said tube having an open inner end and a curved outer end portion terminating in an open flaring end, a conductor cable extending through said tube, said cable having a flexible inner end portion extending beyond the inner end of said tube and a plug at its inner end for attachment to the cleaner, a plug at the outer end of said cable for attachment to a source of current and a resilient extensible helically coiled intermediate portion adapted to be housed within said tube, said helically coiled portion being of a length when contracted to extend substantially the full length of said tube and being freely movable outwardly and inwardly through said flared end when extended by tension and retracted by its own resiliency, and a member at the inner end of said tube for limiting the inward movement of said coiled portion.

2. In a vacuum cleaner, a cleaner body, a propeling handle comprising an elongated tube and a fork connecting the inner end of said tube to said cleaner body, said tube having an open inner end and a curved outer end portion terminating in an open flaring end, a conductor cable extending through said tube, said cable having a flexible inner end portion extending beyond the inner end of said tube and a plug at its inner end for attachment to the cleaner, a plug at the outer end of said cable for attachment to a source of current and a resilient extensible helically coiled intermediate portion, said helically coiled portion being of a length when contracted to extend substantially the full length of said tube and being freely movable outwardly and inwardly through said flared end when extended by tension and retracted by its own resiliency, and means for detachably anchoring the inner end of said coiled portion to the inner end of said tube.

3. In a vacuum cleaner, a cleaner body, a propelling handle comprising an elongated tube and a fork connecting the inner end of said tube to said cleaner body, said tube having an open inner end and an outer open flaring end, a conductor cable extending through said tube, said cable having a flexible inner end portion extending past the open inner end of said tube, a flexible outer end portion extending beyond the outer end of the tube and a resilient extensible helically coiled intermediate portion adapted to be housed within the tube, said helically coiled intermediate portion being of a length when contracted to extend substantially the full length of said tube and being freely movable outwardly and inwardly through said flared end when extended by tension and retracted by its own resiliency, the space between the coils of said helically coiled portion when contracted to its normal position within the tube being less than the thickness of said cable, a member at the inner end of the tube for limiting the inward movement of said coiled portion, a plug at the outer end of the cable for attachment to a source of current, and a plug at the inner end of said cable for attachment to the cleaner, the latter plug being of a size to pass through said tube.

CHARLES H. MacFARLAND.

REFERENCES CITED

The following references are of record in the file of this patent:

UNITED STATES PATENTS

| Number | Name | Date |
| --- | --- | --- |
| 1,573,799 | Bosworth | Feb. 23, 1926 |
| 1,936,463 | Strang | Nov. 21, 1933 |
| 2,039,475 | Campbell | May 5, 1936 |
| 2,142,654 | Posner | Jan. 3, 1939 |
| 2,209,912 | Deems | July 30, 1940 |